H. L. TANNER.
ELECTRICAL DISTRIBUTION SYSTEM FOR GYROSCOPIC COMPASSES.
APPLICATION FILED FEB. 27, 1919.
1,378,296.
Patented May 17, 1921.
2 SHEETS—SHEET 1.
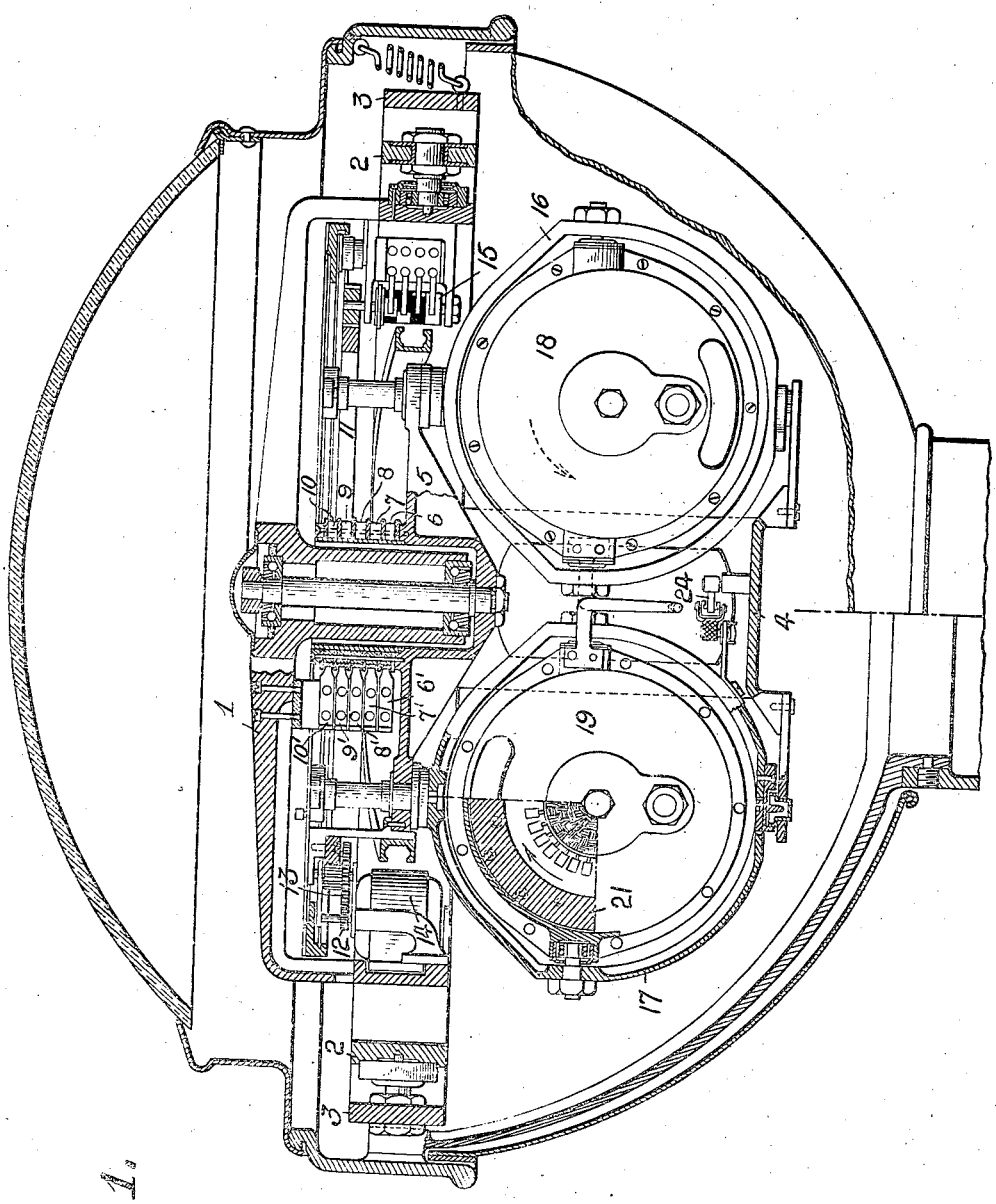
INVENTOR
HARRY L. TANNER.
BY Herbert H. Thompson
his ATTORNEY

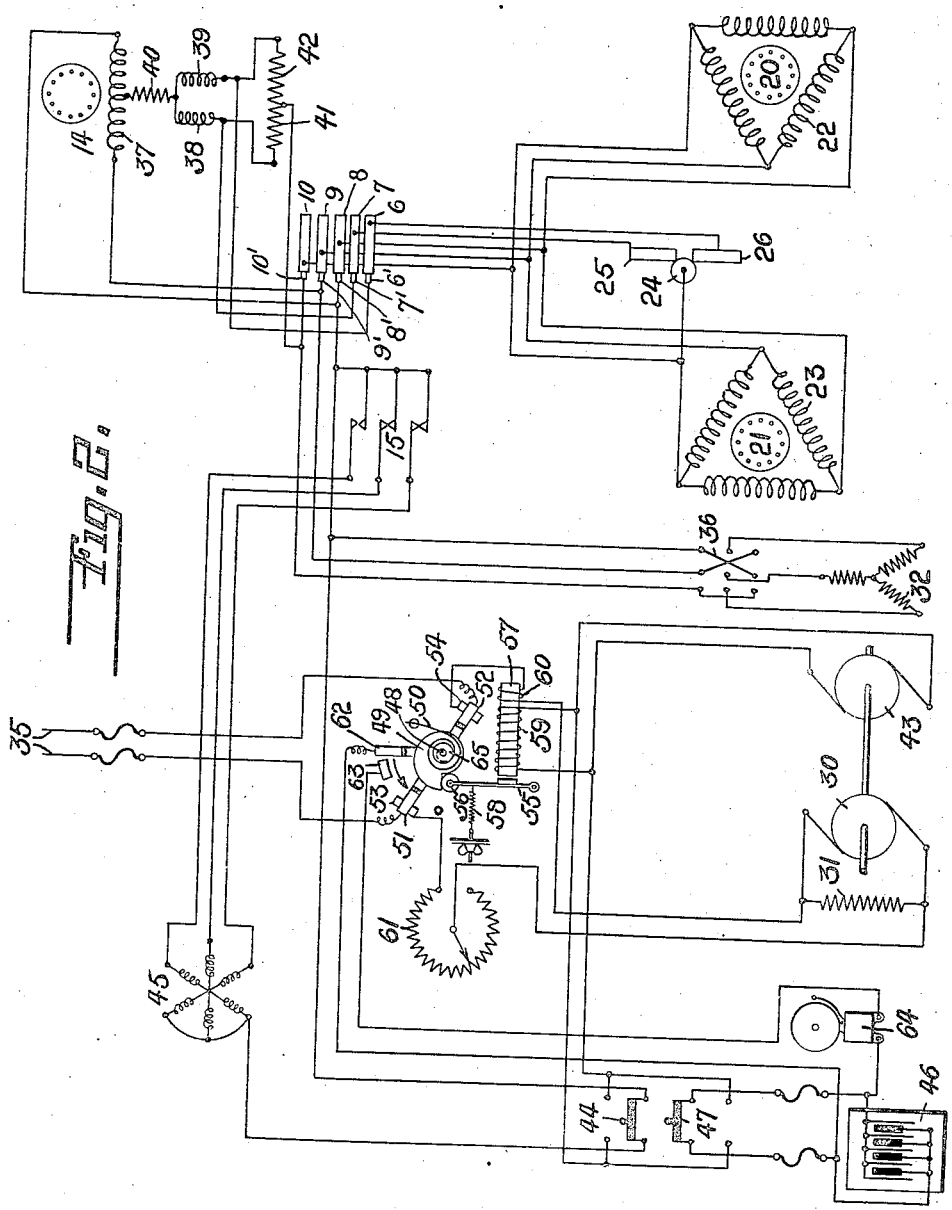

UNITED STATES PATENT OFFICE.

HARRY L. TANNER, OF BROOKLYN, NEW YORK, ASSIGNOR TO THE SPERRY GYROSCOPE COMPANY, OF BROOKLYN, NEW YORK, A CORPORATION OF NEW YORK.

ELECTRICAL DISTRIBUTION SYSTEM FOR GYROSCOPIC COMPASSES.

1,378,296.

Specification of Letters Patent. Patented May 17, 1921.

Application filed February 27, 1919. Serial No. 279,577.

*To all whom it may concern:*

Be it known that I, HARRY L. TANNER, a citizen of the United States of America, residing at 1144 East 19th street, Brooklyn, New York, in the county of Kings and State of New York, have invented certain new and useful Improvements in Electrical Distribution Systems for Gyroscopic Compasses, of which the following is a specification.

This invention relates to gyro-navigational equipment. More specifically it relates to a system of supplying energy to such equipment and to means for indicating failure of the main supply.

Gyroscopic compasses comprise one or more gyroscopes as the directionally sensitive element. The accuracy of these instruments is a direct function of the speed of the gyro rotor or rotors. Electrical means are usually employed to run the rotor or rotors so that the importance of maintaining an uninterrupted source of supply is apparent.

The present invention has for its principal object to provide a system wherein an auxiliary source of energy is automatically substituted for the main supply when the latter fails.

In commercially effective gyro equipments the directionally sensitive element is not utilized to actuate the indicating elements directly but is employed to actuate a control element which controls a motor which actuates an azimuth element. The last mentioned element is usually employed to actuate a transmitter which is connected to a repeating indicator or compass.

A second object of the invention is to provide a novel form of motor and connections for actuating said azimuth element. Other objects and advantages will appear as the invention is hereinafter developed.

Referring to the drawings which illustrate what I now consider a preferred form of my invention:

Figure 1 is a fragmentary sectional elevation of one form of master compass.

Fig. 2 is a wiring diagram illustrating one form of the invention.

While my invention is applicable to various forms of gyro-compasses I have, for convenience, illustrated it in connection with the compass disclosed in my copending application, Serial No. 110,020, filed July 19, 1916. Referring to Fig. 1 which is substantially identical to Fig. 1 of said copending application it will be seen that this compass comprises the following structure.

A spider 1, pivotally mounted in Cardan rings 2, 3, supports the azimuth element 4 for rotation about a vertical axis. The rotatable unit 4 is provided with an extension 5 carrying collector or slip rings 6 to 10 inclusive adapted to lead current into the rotatable unit from brushes 6' to 10' fixed to the spider 1. These rings not only lead in the three phase current for driving the rotors but also introduce current for the auxiliary control devices as hereinafter described. The azimuth element 4 has fixed thereto a large gear 11 adapted to be driven through reduction gearing 12, 13 by a motor 14 fixed to spider 1. The gear 11 is geared also to a transmitter 15, the purpose of which will appear later.

The gyroscopic units, proper, are shown as mounted within vertical rings 16, 17 which are pivotally supported about their vertical axes within the main frame or element 4. The rotor casings 18, 19 are pivoted on horizontal axes within their respective rings 16, 17. The rotors 20, 21 within casings 18, 19 are adapted to be driven in the direction of the arrows by virtue of a squirrel cage winding on the said rotors and relatively fixed three phase stator windings 22, 23. The ring 17 carries a trolley or brush 24 adapted to engage and coöperate with reversing contacts 25, 26 secured to the element 4.

For a more complete description of the structure and operation of the master compass illustrated in Fig. 1 reference should be had to my said copending application or to my British Patent 108,149, accepted October 29, 1917, "improvements in gyroscopic direction-indicating apparatus." Suffice it to say at this point that the gyro 19 so controls the motor 14 through the contacts 24, 25, 26 that the azimuth position of the element 4 is maintained substantially fixed with reference to gyroscope 19.

As three-phase A. C. is not available on most ships I provide means for supplying such current. This means may assume the form of a dynamotor comprising a D. C. armature 30, shunt field winding 31, and a three-phase stator winding 32. The elements 30, 31 are adapted to receive electrical energy from the D. C. mains 35, through connections hereinafter described, and thus drive the dynamotor to generate three-phase A. C. in the stator 32. The latter supplies the gyro stators 22, 23 through connections including a reversing switch 36, brushes 8', 9', and 10' and slip rings 8, 9, and 10.

In order to minimize the number of electrical connections, and for other reasons, I prefer to operate the motor 14 from the same source 32 from which the stators 22, 23 receive their energy. In order to enable me to reverse motor 14 by employing only two contacts 25, 26 and at the same time retain the advantage of a polyphase induction motor, I have devised a special form of winding for the motor. By this winding I convert the motor 14, in effect, into a two-phase induction motor which is operable on a three-phase circuit. One of the stator windings 37, which may be termed the main winding, is connected to two of the phases which supply stators 22 and 23 and a tap is taken off said winding 37 at a point between its ends, preferably near its center. Connected to said tap are two coils 38, 39, termed teaser windings, which are alternately connected to the third phase through the trolley 24, contact 26 or 25, ring 6 or 7, and brush 6' or 7'. Preferably I interpose a resistance 40 in the tap mentioned above to limit the current through the coils 38, 39 when both are in the circuit, i. e., when the trolley 24 is in the neutral position. With the trolley in the last mentioned position the C. E. M. F. due to inductance disappears so that unless resistance is provided a destructive rush of current would take place. I prefer also to connect discharge resistances 41, 42 across the trolley 24 and contacts 25, 26 respectively to prevent or reduce arcing between the last mentioned elements. It will be understood of course that the windings 38, 39 are oppositely wound or connected so as to cause the motor to run in one direction or the other depending on which of these windings is energized. As far as this application concerns the construction of this motor, it is a continuation of my aforesaid application No. 110,020.

The voltage available on the average ship is higher than is desirable to supply the transmission system connecting the master instrument and the repeater or repeater compasses. The first mentioned voltage is usually around 100 or 110 whereas a voltage of about 20 is found preferable for the repeater system. The lower voltage may be conveniently supplied by providing the dynamotor with D. C. armature 43 which may be termed the low voltage armature. The terminals of the latter are shown connected through a switch 44 to one terminal of the transmitter 15 and repeating device 45, which are in turn electrically connected to each other. It is to be understood, of course, that the repeating device is to be employed to actuate a repeater or dummy compass so that the latter will indicate the heading of the ship at all times. A suitable type of such repeater compass is illustrated and described in the United States patent to Elmer A. Sperry 1,255,480, patented February 5, 1918, and need not be illustrated in this application.

It will be noted that, with the system thus far described, failure of the line 35 not only would cause interruption of the supply to the gyro stators 22, 23, but to motor 14, and the transmission system 15, 45 so that derangement of the entire system would result. I therefore provide an auxiliary source of energy which may be substituted for the supply 35, on failure of the latter, to furnish energy to the elements above named. This auxiliary source may assume the form of a storage battery 46. In order to be capable of being substituted directly in place of the mains 35 to drive the dynamotor the battery 46 would necessarily have to be of a rather high voltage. I prefer, therefore, to employ the battery to supply energy to the armature 43 to drive the dynamotor when the supply 35 fails. At the same time the battery may be employed to supply energy to the transmission system 15, 45 when called upon to do so. While the change over in connections necessary to substitute the auxiliary source for the main supply may be effected manually I prefer to accomplish it automatically. One form of means and connections for accomplishing these operations may be constructed substantially as follows.

The battery 46 is normally connected to the armature 43 through a switch 47, i. e., the battery normally floats on the low-voltage armature line and is charged by the E. M. F. generated in said armature 43. As will be understood by those skilled in the art, when the speed of the dynamotor drops below a predetermined amount the voltage generated by the armature 43 will drop below that of the storage battery 46 so that the latter will supply energy to said armature to drive the dynamotor. If the armature 30 were directly connected to the mains 35 the dynamotor would, under the conditions named, pump energy back on the mains 35 thus putting an enormous load on the dynamotor and through the dynamotor on the battery. In order to prevent this action I provide what I term an automatic cut-out for disconnecting the elements 30 and 31 from the mains 35 when the voltage across the latter drops below a predetermined amount. This cut-out may be constructed substantially as follows.

The shaft 48 has secured thereto a cam 49 and is biased in the direction of the arrow by means of a spring 50. The shaft 48 has also secured thereto, but insulated therefrom, a pair of contact arms 51, 52 adapted to engage the fixed contacts 53 and 54, respectively. A lever 55 is provided with a roller 56 adapted to engage the shoulder on cam 49 so as to hold the parts normally in the position shown in Fig. 2. A two-winding solenoid 57 is provided for holding the lever in the normal, operative position against the action of a spring 58. One of the windings designated 59 is connected across the low voltage armature 43 while the other winding 60 is connected in the circuit of the elements 30 and 31 which may now be completely described as follows:

The mains 35 are connected to the switch arms 51, 52. The fixed contact 53 is connected through a rheostat 61 to one terminal of the elements 30, 31. The other terminal of the latter is connected through the winding 60 to the fixed contact 54. The connection of the coils or windings 59 and 60 is such that when the line 35 is supplying energy to the elements 30, 31 the solenoid coils aid each other and hold the lever 55 in the position shown. When, however, the voltage across the said mains 35 drops to such a value that the armature 30 supplies energy to said mains the current through the coil or winding 60 reverses. The pull of the solenoid 57 on the lever 55 is then insufficient to hold the latter in its normal position against the action of the spring 58. The lever is thereupon disengaged from the shoulder of the cam 49 so that the spring 50 rotates the switch arms 51, 52 from the position indicated to a position out of engagement with the contacts 51, 54. While at this time the armature 30 acts as a generator armature it is disconnected from the main line and supplies only the energy necessary to excite the shunt field winding 31.

In order to apprise the operator or attendant of failure of the main supply I prefer to provide an alarm system which automatically becomes operative on operation of the cut-out above described. This alarm system may assume the form illustrated and be constructed substantially as follows.

The shaft 48 has secured thereto, but insulated therefrom, a switch arm 62 which is normally out of engagement with a fixed contact 63 but is adapted to engage the latter on operation of the automatic cut-out. The contacts 62, 63 are shown connected in series with a bell or other indicating device 64 and the storage battery 46. The complete operation of my system may be summarized as follows.

Assuming that the automatic cut-out is in the position shown in Fig. 2 and that the switches 36, 44, and 47 are closed, it will be seen that the dynamotor armature 30 will receive energy from the main line and will supply low voltage D. C. to the 35 and to the transmission system 15, 45 and to the battery 46 to charge the latter. The dynamotor will also supply three-phase A. C. to the gyro stators 22, 23 and to the azimuth motor 14. Should the voltage across the mains 35 drop below the value required to maintain the desired speed of the gyros and the necessary voltage across the rest of the system the storage battery 46 will supply energy to the armature 43 to drive the latter as a motor and the armature 30 as a generator. The current through the solenoid winding 60 then reverses and the cut-out operates to break the connections between the armature 30 and the mains 35 and simultaneously to close contacts 62, 63 to cause the bell 64 to ring. It will be noted that the battery 46 is substituted for the main supply 35 on failure of the latter and not only supplies electrical energy to the transmission system 15, 45 but also to the gyro stators 22, 23 and motor 14 through the three-phase generator winding 32. When the alarm is sounded the operator will of course make an inspection of the system in an endeavor to determine the cause of the failure of the line 35 and to remedy whatever trouble exists. As soon as the voltage across the mains 35 picks up to the desired value the automatic cut-out may be reset to its normal position by rotating a handle 65 fixed on shaft 48 in a clockwise direction until the lever 55 automatically drops under the shoulder of the cam 49. This operation cuts out the alarm and restores the circuits to the normal condition.

While I have described the automatic cut-out as operating when there is a reversal of current in the series coil 60 it will be apparent to those skilled in the art that it may be adjusted to operate before such reversal takes place, i. e. on any predetermined drop of main line voltage, by adjusting the tension of the spring 58. It is to be understood, therefore, that in employing the expression "failure" in connection with the main supply I mean that condition of the main source which is found to be unsatisfactory so far as maintaining the speed of the rotors and the voltage of the rest of the system is concerned.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In combination, an electrically driven gyroscopic rotor, a system for supplying energy to said rotor, said system comprising a main source of supply, an auxiliary source of supply and means for automatically causing said auxiliary source to supply energy to the rotor on failure of the main supply.

2. The combination with a compass having a directionally sensitive element including a gyroscopic rotor, of means for supplying driving energy to said rotor, an auxiliary source of supply for said rotor and means for automatically substituting said auxiliary source for the first named means.

3. In combination, a gyroscopic rotor, a main source of E. M. F., means normally connected to said main source for driving said motor, means controlled by said source for automatically disconnecting the same from said first named means, and an auxiliary source of supply for supplying energy to drive said rotor when said main source is disconnected.

4. In combination, a gyroscopic rotor, a main source of E. M. F., a dynamo-electric machine adapted to receive energy from said source and to supply energy to said rotor, means for automatically disconnecting said machine from said source and an auxiliary source of E. M. F. for driving said machine when the main source is disconnected.

5. In combination, a directionally sensitive element comprising a gyroscopic rotor, a repeating system controlled by said element, a dynamo-electric machine for supplying energy of different characteristics to said element and system, a main source of power for said machine and means for supplying energy to that element of the machine, which normally supplies energy to said repeater system, on failure of said main source.

6. In combination, a gyroscopic navigation instrument, an electrical repeating device controlled thereby, a dynamo electric machine for supplying current to said instrument, a storage battery connected to one of the elements of said machine, electrical connections between said repeating device and element and main line connections to another element of said machine.

7. In combination, a gyroscopic rotor, an electric motor for driving said rotor, a generator winding connected to said motor, means comprising an armature, wound for a comparatively high voltage, and a comparatively low voltage D. C. armature, mechanically connected to said first named armature, for causing an E. M. F. to be generated in said generator winding; main line connections for said high voltage armature and means for automatically supplying current to said D. C. armature when the main line voltage fails.

8. In combination, a gyroscopic navigation instrument, an electrical repeating device controlled thereby, a dynamo electric machine for supplying current to said instrument, a storage battery connected to one of the elements of said machine, electrical connections between said repeating device and element, main line connections to another element of said machine, and a low voltage cut-out in said main line connections.

9. In combination, an electrically driven gyroscopic rotor, means comprising alternative sources of supply for driving said rotor and means controlled by one of said sources for automatically disconnecting the same on failure thereof.

10. In combination, a gyroscopic rotor, electrical means for supplying rotative energy to said rotor, a main source of supply for said means, a secondary source of supply for said means, means for delivering energy from said main source to said auxiliary source and means for preventing said main source from absorbing energy from said auxiliary source.

11. In combination, an electrically driven gyroscopic rotor, means comprising alternative sources of supply for driving said rotor, means controlled by one of said sources for automatically disconnecting the same on failure thereof and alarm means controlled by said disconnecting means.

12. The combination with a compass having a directionally sensitive element including a gyroscopic rotor, of means for supplying driving energy to said rotor, an auxiliary source of supply for said rotor, means for automatically substituting said auxiliary source for the first named means and alarm means for indicating such substitution.

In testimony whereof I have affixed my signature.

HARRY L. TANNER.